UNITED STATES PATENT OFFICE.

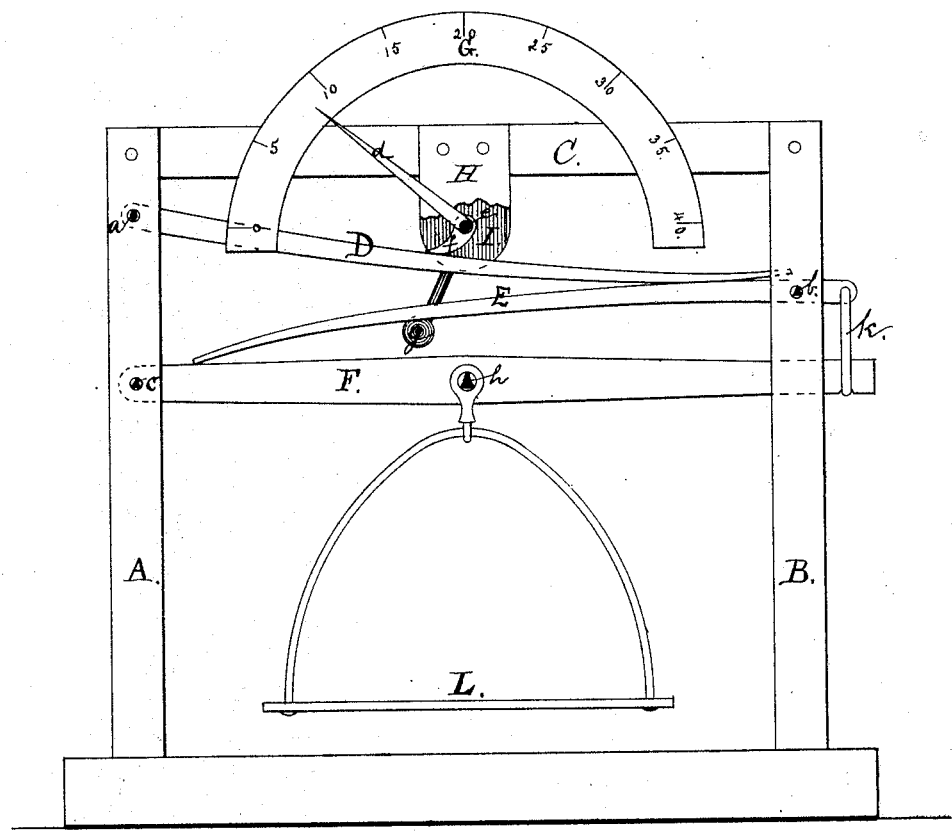

HENRY C. WINGATE, OF NEW ORLEANS, LOUISIANA.

IMPROVEMENT IN WEIGHING-SCALES.

Specification forming part of Letters Patent No. 166,575, dated August 10, 1875; application filed January 16, 1875.

*To all whom it may concern:*

Be it known that I, HENRY C. WINGATE, a resident of the city of New Orleans and State of Louisiana, have invented a certain new and useful Improvement in Weighing-Scales; and I do hereby declare the following to be a full, clear, and correct description of the same, reference being had to the annexed drawing making a part of this specification.

My improved scale consists of two upright standards, A B, connected at their upper ends by means of the tie-beam C. Through the standards A B, and on a line parallel with the tie-beam C, recesses are cut, in which are pivoted the levers D, E, and F, as shown at *a b c*. The said recesses are of a sufficient width and depth to permit of a free movement of the levers within the same. G is a dial-plate secured to the tie-beam C, on which an index-finger, *d*, accurately indicates the weights of articles immediately on their being placed on the platform of the scale. The said index-finger *d* is keyed to the front end of the shaft *e*, which operates in the journal-boxes of the hangers H I. Between these hangers a cam, *f*, is keyed or otherwise secured to the shaft in such a manner that the toe of the same may rest lightly upon the upper steelyard D when the scale is not in operation. *g* is a weighted crank, which is secured to the rear of the shaft *e*, for the purpose of bringing the index-finger back to the starting-point immediately on the scale being relieved of the goods previously placed upon it. The projecting ends of the levers E and F are connected by a metal link, K, by means of which motion is transmitted from one to the other. L is a basket or platform for holding the articles which it is desired to weigh. This basket or platform may be suspended from the lever F, as shown at *h*, or it may be secured to the link K, the latter case dispensing with the lever F.

My improved scale is simple, cheap, and compact, and by its use a quick and accurate measure of weight is obtained. Its advantages over the ordinary balance or spring scales is readily apparent.

Having described my invention, what I claim as new, and desire to secure by Letters Patent, is—

The pivoted levers D E F, formed and secured as shown, cam *f*, shaft *e*, index-finger *d*, weighted crank *g*, and dial-plate G, the whole being combined and arranged to operate substantially as described.

In testimony of said invention I have hereunto set my hand.

HENRY C. WINGATE.

Witnesses:
 H. N. JENKINS,
 J. C. HUBBELL.